UNITED STATES PATENT OFFICE.

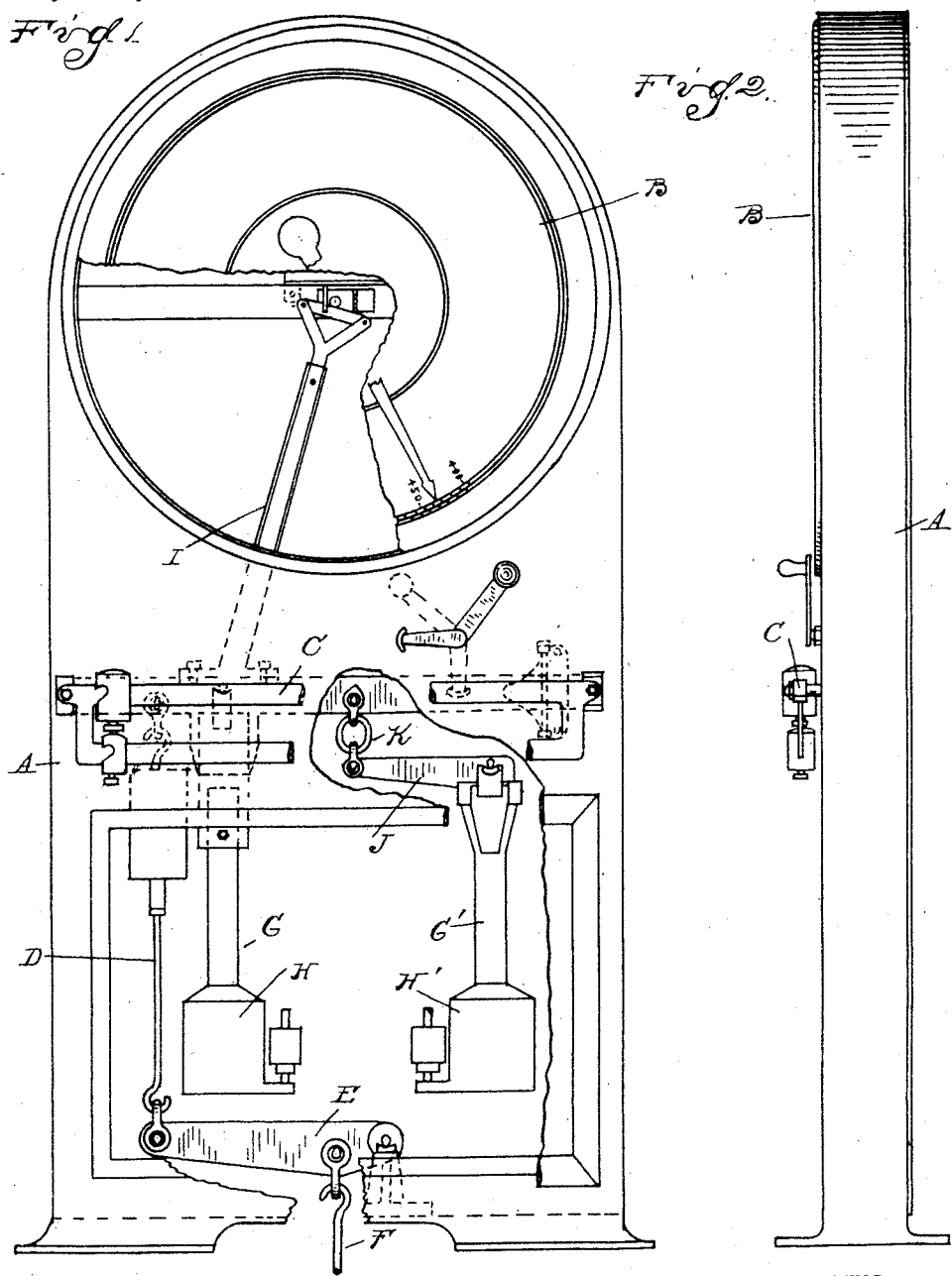

MODESTE J. LACHANCE, OF ST. JOHNSBURY, VERMONT, ASSIGNOR TO E. AND T. FAIRBANKS AND COMPANY, OF ST. JOHNSBURY, VERMONT, A CORPORATION OF VERMONT.

COMPENSATING PENDULUM-WEIGHT MECHANISM FOR DIAL-SCALES.

1,268,855.  Specification of Letters Patent.  Patented June 11, 1918.

Application filed May 29, 1914. Serial No. 841,753.

*To all whom it may concern:*

Be it known that I, MODESTE J. LACHANCE, a citizen of the United States of America, residing at St. Johnsbury, in the county of Caledonia and State of Vermont, have invented certain new and useful Improvements in Compensating Pendulum-Weight Mechanism for Dial-Scales, of which the following is a specification, reference being had therein to the accompanying drawing.

The invention relates to automatic indicating scales of that type employing pendulum weights, and it is the object of the invention to provide a compensating means which guards against inaccuracies where the scale is not perfectly level.

In the drawings:

Figure 1 is a front elevation; and

Fig. 2 is a side elevation thereof.

A is the frame of the scale, B is a dial indicator mounted thereon, C is a horizontally-extending beam, D is a steelyard connection thereto, E is an intermediate lever, and F a second steelyard, leading to the platform levers (not shown). The beam C is provided with a depending pendulum or bobber G, which has the weight H adjustably secured to the lower end thereof. Thus any movement of the steelyard will cause a rocking of the beam, which is resisted by the deflection of the pendulum or bobber from the vertical position. The movement of the beam is transmitted to the dial through a suitable connecting arm I, which thereby effects a corresponding indication.

Scales of the type just described are dependent for accuracy upon the accurate level of the mechanism. Thus if the frame is tilted in one direction there will be an over-indication, while a tilting in the opposite direction will cause an under-indication. To compensate for this, I have provided an auxiliary bobber G' provided with a corresponding weight H'. This auxiliary bobber is provided with a laterally-extending arm J connected by a link K with the beam C and extending from its fulcrum in an opposite direction to that of the beam and its fulcrum. The two bobbers G and G' with their weights H and H' are adapted to coöperate to produce the correct indication of weight where the scale is properly leveled, or, in other words, the work is divided between the two bobbers and is performed equally thereby. With such a construction if the scale is slightly out of level the work performed by one of the bobbers will be correspondingly increased, which of itself would result in an under-indication. Such a result is, however, prevented by the fact that the work of the other bobber will be decreased so that the combined effect of both bobbers is the same as where the scale is level. Thus within certain limits the scale will weigh as accurately where out of level as when accurately level.

What I claim as my invention is:—

1. In a scale, the combination with an indicator, of an actuating arm therefor, a beam or lever on which said actuating arm is mounted, a pendulum weight connected with said beam or lever, a steelyard rod for actuating said beam and deflecting said pendulum weight in one direction, an auxiliary pendulum weight, an arm or beam projecting therefrom in a direction from the fulcrum opposite to the projection of said beam or lever from its fulcrum, and a link connection between said beam and said arm on the auxiliary pendulum weight, said main and auxiliary pendulum weights coöperating and reacting equally when the scale is level and compensating for mutual inaccuracies when the scale is out of level.

2. In a scale, the combination with an indicator, of an actuating arm therefor, a horizontally-extending beam or lever upon which said arm is mounted, a pendulum weight depending therefrom in line with the fulcrum of said beam, a second pendulum weight, an arm extending therefrom in an opposite direction from the extent of said beam from the fulcrum of the first-mentioned pendulum weight, a link connection between said arms, a steelyard rod in a plane intermediate said pendulum weights, a lever connected thereto, and a steelyard connection between said lever and said beam at one side of said first-mentioned pendulum weight for the purpose described.

3. In a scale, the combination with a frame or casing having a dial indicator at the upper end thereof, of a pair of pendulum weights beneath said dial, arms or levers extending oppositely from said pendulum weights and linked to each other to produce an equal reaction with a deflection of said weights in opposite directions, an arm connected with one of said pendulum weights for actuating said indicator, a steelyard rod in a plane intermediate said pendulum weights, a lever connected thereto, and a steelyard rod for connecting said lever with one of said pendulum weights arranged on the opposite side thereof from the direction in which it is deflected.

In testimony whereof I affix my signature in presence of two witnesses.

MODESTE J. LACHANCE.

Witnesses:
J. H. A. BOUSFIELD,
GEO. R. BALLINGER.

Copies of this patent may be obtained for five cents each, by addressing the "Commissioner of Patents, Washington, D. C."